March 21, 1972   C. W. RAETZSCH ET AL   3,650,939
ALKALI CHLORINE CELL
Filed April 4, 1969   9 Sheets-Sheet 6
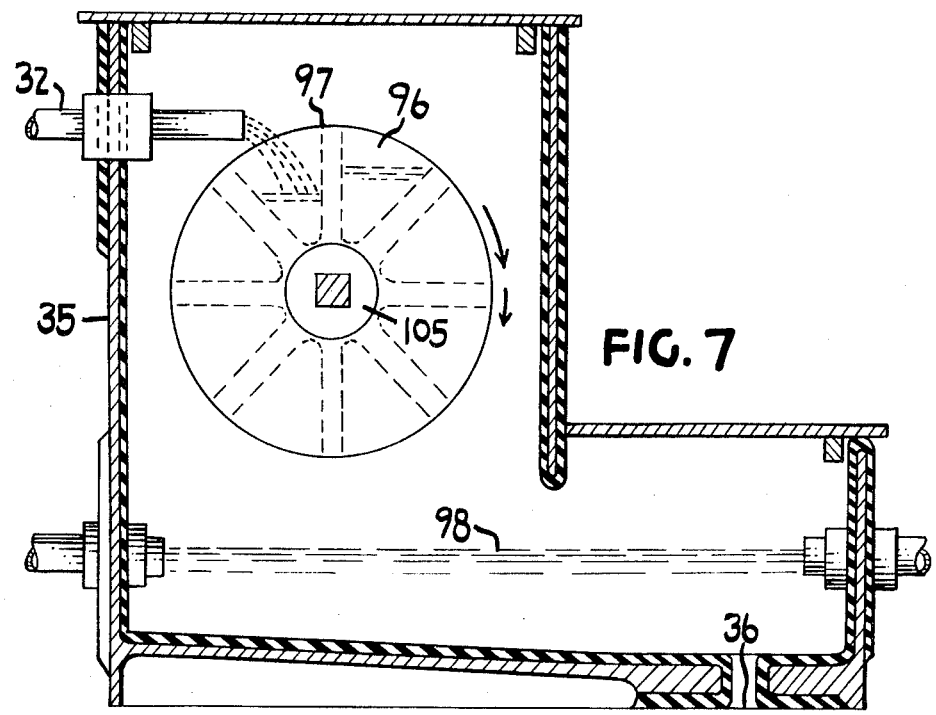
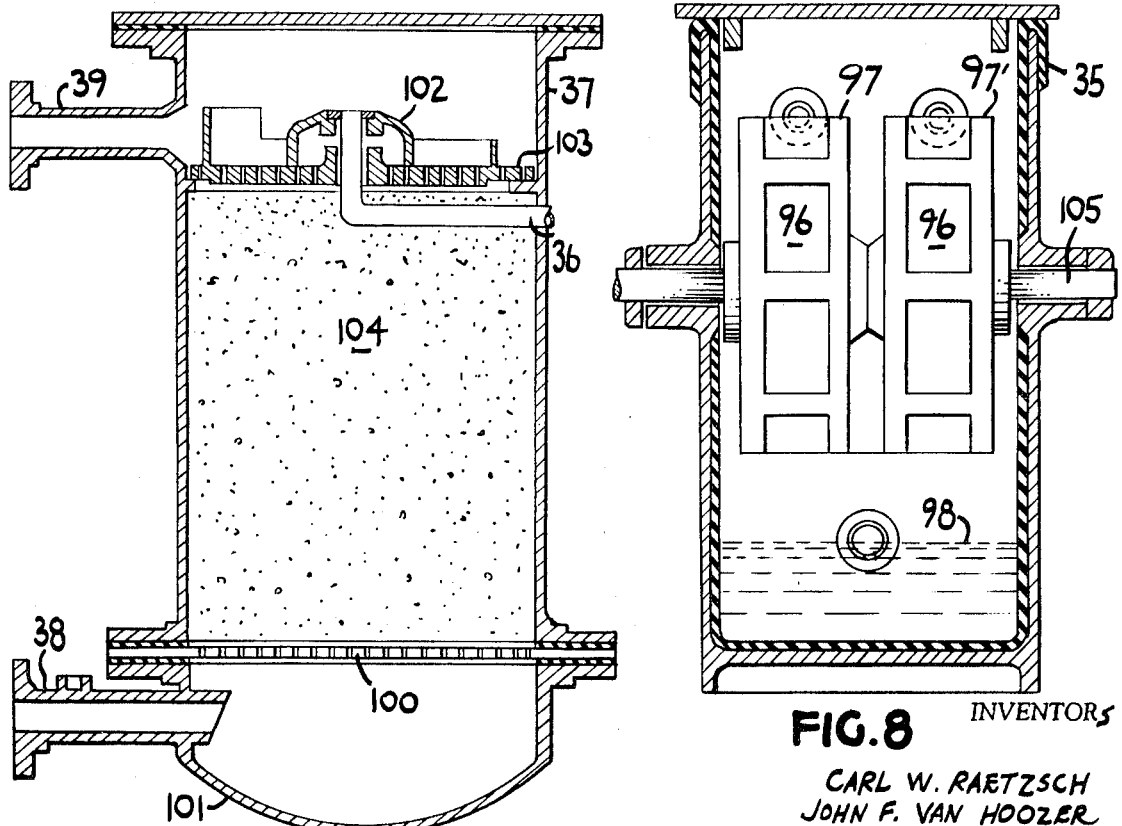
INVENTORS
CARL W. RAETZSCH
JOHN F. VAN HOOZER
HUGH CUNNINGHAM
BY Chisholm and Spencer
ATTORNEYS

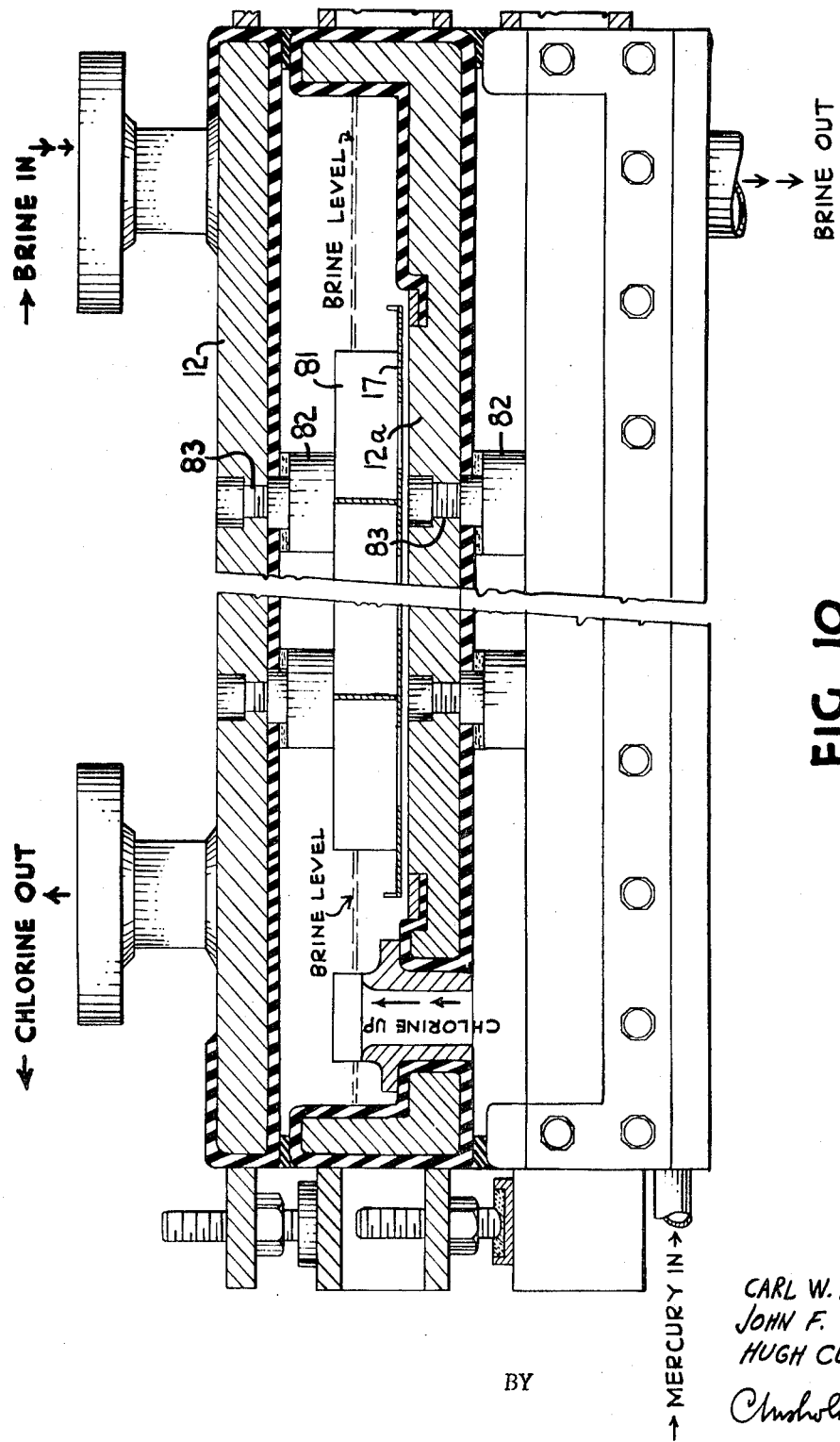

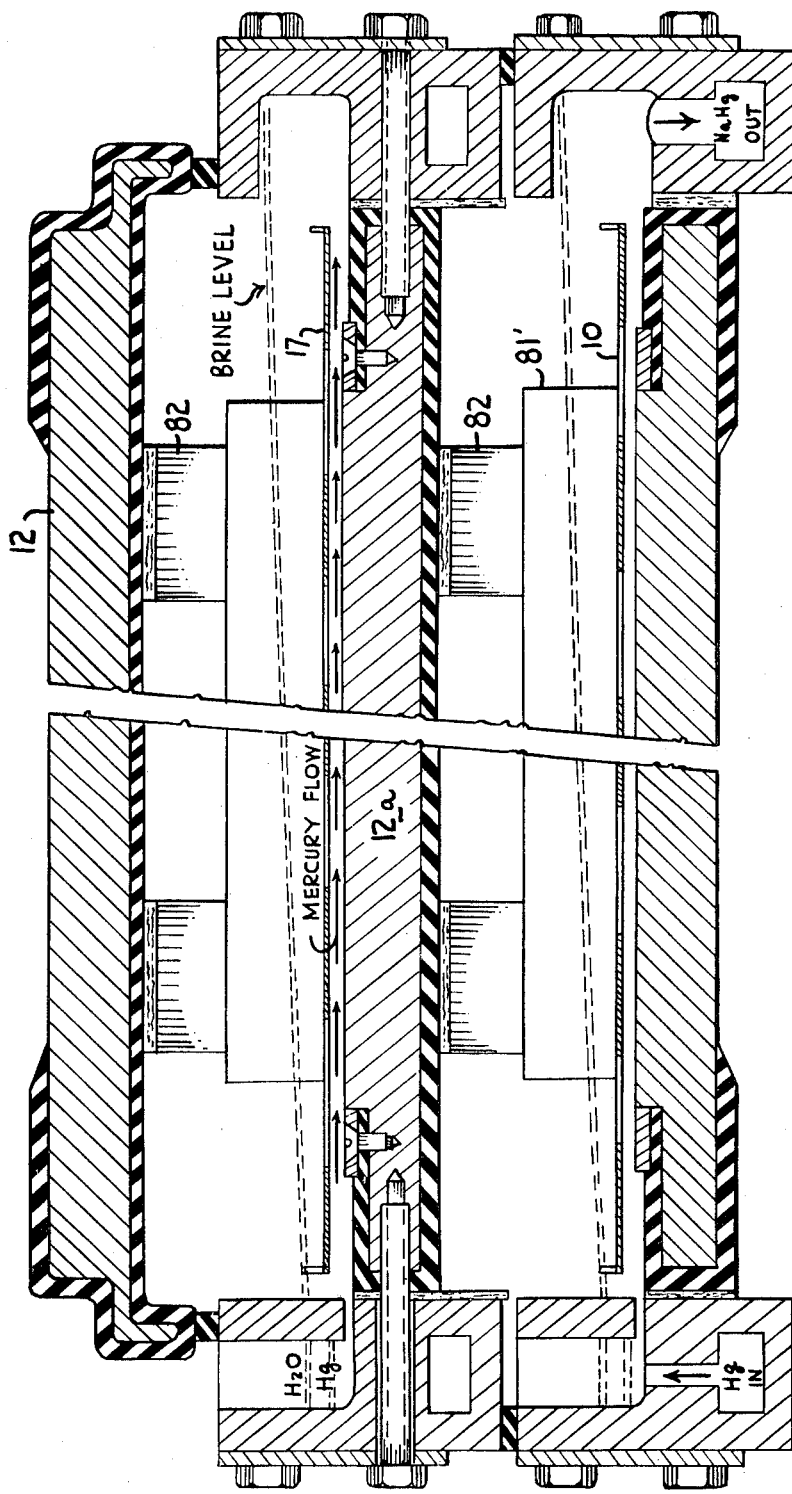

United States Patent Office 3,650,939
Patented Mar. 21, 1972

3,650,939
ALKALI CHLORINE CELL

Carl W. Raetzsch, John F. Van Hoozer, and Hugh Cunningham, Corpus Christi, Tex., assignors to PPG Industries, Inc., Pittsburgh, Pa.
Continuation-in-part of application Ser. No. 410,579, Nov. 12, 1964. This application Apr. 4, 1969, Ser. No. 813,588
Int. Cl. C22d 1/04; B01k 3/00
U.S. Cl. 204—219      4 Claims

ABSTRACT OF THE DISCLOSURE

An electrolytic cell comprising a stack of bipolar units is provided. These units each comprise a mercury cathode tray and anodes disposed below the tray so that the anodes oppose the mercury cathode of a lower unit and the mercury cathode opposes the anodes of an upper unit. Means are provided to adjust the relative level of the units. This means comprises a support on one of the units and an adjustable screw on the next adjacent element which rests upon or bears against the support of the first unit. The support-screw assembly is provided with insulation to electrically isolate the units.

CROSS-REFERENCE TO RELATED APPLICATIONS

This application is a continuation-in-part of our application Ser. No. 410,579, filed Nov. 12, 1964 now abandoned.

DESCRIPTION OF THE INVENTION

This invention is directed to provision of an electrolytic multipolar alkali chlorine cell which may be readily disassembled and in which the several units may be easily adjusted to adjust the slope thereof or the electrode spacing between adjacent anodes and cathodes.

For a more complete understanding of the present invention, reference is made to the accompanying drawings in which:

FIG. 7 is a cross-section of the amalgam splitter 35 of FIG. 1, taken along the mid line III—III of FIG. 1.

FIG. 8 is a section of the amalgam splitter 35 of FIG. 1, taken along lines IV—IV, showing the details of the lining of the splitter.

FIG. 9 is a cross-section of the amalgam denuder 37 of FIG. 1, taken along the mid line V—V.

FIG. 10 is a cross-section of the cell of FIG. 2 with the center partially omitted, taken along the line I—I, and having a further embodiment of the anode support member of the cell in lieu of the support shown in FIG. 2, and showing another embodiment of the support means.

FIG. 11 is a cross-section along lines II—II of the cell of FIG. 2 with the center partially omitted and showing the anode support modification of FIG. 10 in lieu of the anode support member of FIG. 2.

Figure 1:
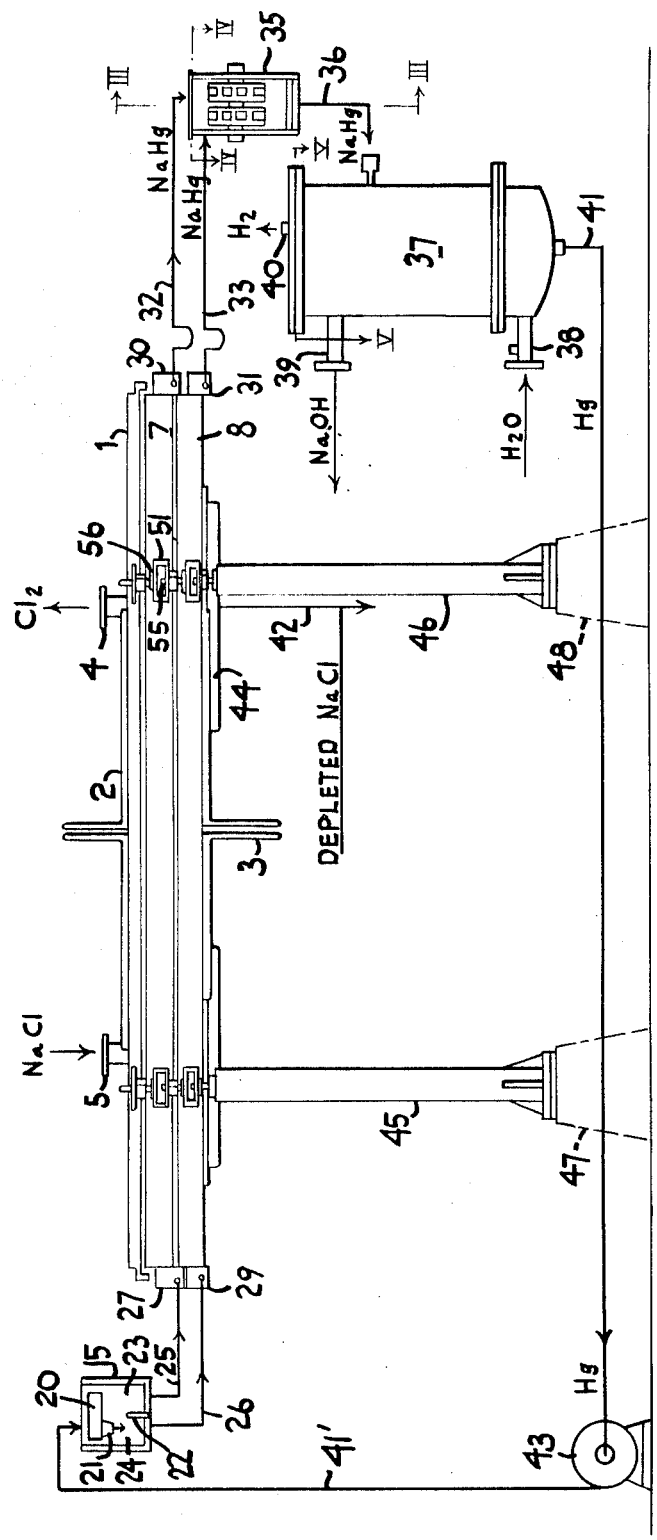
FIG. 1 represents a side elevation of the bipolar mercury cell of the instant invention showing an anode half cell, a cathode half cell, and an intermediate cell unit having an anode and a cathode disposed between the top half cell and the bottom half cell of the bipolar mercury cell shown.
Figure 2:
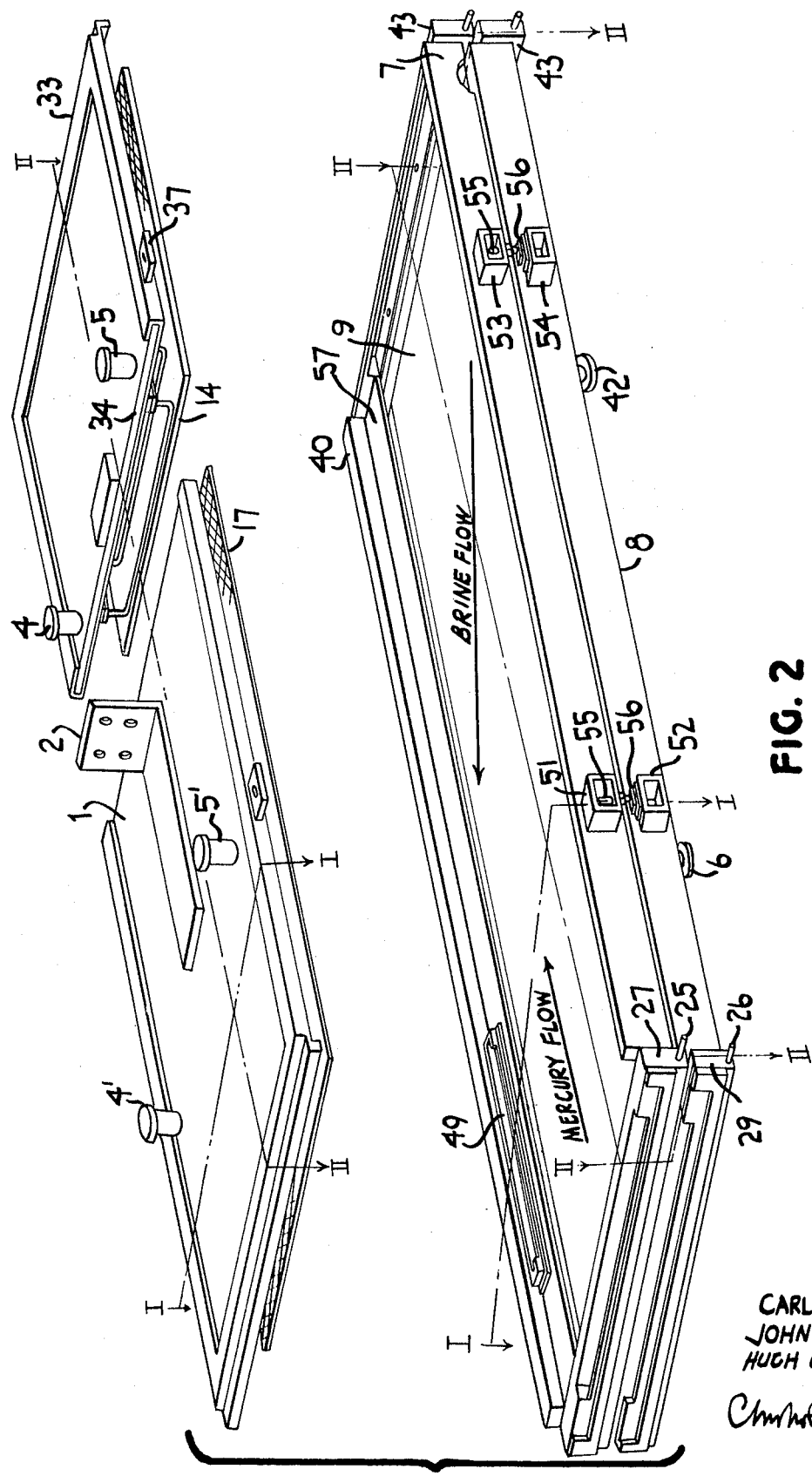
FIG. 2 is a plan view, partially in perspective, with the cover broken away to show the anode member of the anode half cell and the cathode tray or surface of the intermediate cell unit positioned above the cathode of the bottom half cell, and indicating the flow of brine and mercury. This view also shows one type of support means herein contemplated.

Turning now to the drawings, with particular reference to FIGS. 1, 2, 3, and 4, there is shown a bipolar flowing mercury cathode alkali-chlorine cell in which, for illustrative purposes, two cells have been shown. As seen in FIG. 1, the cells are composed of an upper anode containing cover member on anode half cell 1 and a cathode containing bottom member on cathode half cell 8. Intermediate the cover member 1 and the bottom member 8 is disposed of bipolar cell unit generally indicated as 7 which contains on its upper surface a tray 9 for the reception of the mercury cathode and on its bottom side an anode 10 to be used in conjunction with the mercury contained in tray 11 of the bottom member 8. See FIG. 4. The cover member 1 is lined with a suitable insulating material such as rubber and the lining 6 protects the underside of the cover 1 and electrically insulates it partially from the cell unit 7 placed below it. The cover member 1 is composed of a back-up plate 12 of steel or other suitable electrically conductive structural metal. The backer plate 12a of the bipolar cell unit contains tapped holes 18 and 18' (see FIG. 3) which are plugged on their upper surface with plugs 19 and 19' and contain within the holes bolts 34 and 34'. The plugs 19 and 19' may be omitted if desired. Operation of the cell without plugs 19 and 19' has been accomplished and some slight improvement in electrical conductivity observed with no deleterious effects encountered. In such an operation the bolts become covered with mercury which apparently assists in conducting current through the bolts from the cell above. These bolts are affixed to, and hold in place against the back plate 12a, a titanium sheathed electrically conductive rod member 13a preferably constructed of copper or aluminum. The titanium sheath 14 is intimately affixed to the rod member by suitable binding material or mechanically attached by compression against the rod so that maximum electrical conductivity between the two metals is realized. The anode 17 of the cell cover 1 is affixed to the titanium sheath 14, such as by welding, and when in place is positioned above the tray 9 of the cell unit 7. Affixed to the outer surface of the cover member 1 is a suitable bus-connector 2 which, during operation of the cell, is suitably bolted to the cell room bus bars (not shown). Several orifices are shown in the cover member of the cell, which orifices are utilized for the performance of certain functions. Thus, in FIG. 2, two orifices 4 and 4' are shown which are utilized as chlorine gas collection points or conduits. Orifices 5 and 5' are utilized for the introdutcion of brine into the cell, as indicated in FIGS. 1 and 2.

In the over-all operation of the cell, as seen looking at FIG. 1, mercury is introduced into the cell by dropping it into the mercury splitting device 15. The mercury splitting device 15 contains a rotating member generally indicated at 20 which rotates on a vertical axis and has a nozzle member 21 attached on the undersurface thereof which constantly emits a flowing stream of mercury. As the device rotates, it passes a dividing member 22 and the mercury is divided into two separate reservoirs 23 and 24. The contents of reservoir 23 are fed through line 25 to a mercury distributor 27. The contents of reservoir 24 are fed through line 26 to a mercury distributor 29. The mercury passes from distributors 27 and 29 across the faces of the trays 9 and 11, respectively (see FIG. 4), and flows to the opposite end or narrow side of the cell. Brine is continuously introduced through brine feed inlets 5 and 5' during this operation and passes from the upper tray 9 to the lower tray 11 in a manner to be described hereinafter. Current is applied to the cell and electrolysis takes place between the face of the anodes 17 and 10 and the surface of the mercury cathode flowing across the cell in trays 9 and 11. Elemental chlorine formed during the electrolysis is removed from the cell through chlorine outlets 4 and 4' in a manner to be described hereinafter. Sodium-mercury amalgam is formed during the electrolysis on the flowing mercury cathode as it passes across the cell and is collected in the cell in the collection sumps 30 and 31. Thus, the contents of tray 11 collect in sump 31 and those of tray 9 in sump 30. The amalgam in sump 30 is introduced into an amalgam splitter 35 through line 32. The amalgam in sump 31 is introduced into splitter 35 through line 33. After passing through the splitter, the amalgam is passed through line 36 to the mercury denuder 37. In the denuder 37 the amalgam is contacted with water introduced through line 38, and the caustic soda product is removed through line 39. Hydrogen evolved during the denuding operation is removed from the denuder through line 40. The denuded mercury is removed through line 41 and is pumped by means of pump 43 through line 41' to the mercury feed splitter 15, and the process is repeated. Depleted brine is removed from the cell through line 42 after having collected in sump 44. It is, of course, to be understood that the depleted brine removed from the cell may be resaturated and utilized once more in the cell in accordance with conventional practices in the art. The cell is supported on posts 45 and 46 which are anchored to the floor of the cell room on footers 47 and 48.

In accordance with the teachings of this invention, the mercury flows in a longitudinal direction across the cell, as shown in FIG. 2. Preferably the brine flows tangentially and at an angle to the flow of mercury in the first cell unit to a brine down-comer 49. This brine then reverses its flow on the next lower tray and flows in the opposite direction, but still tangential to the flow of mercury in that tray. The mercury flow in all the trays is preferably in the same direction. Thus, as shown in FIGS. 2 and 5, the mercury introduced through lines 25 and 26 enters mercury feed distributors 27 and 29, respectively.

Figure 5:
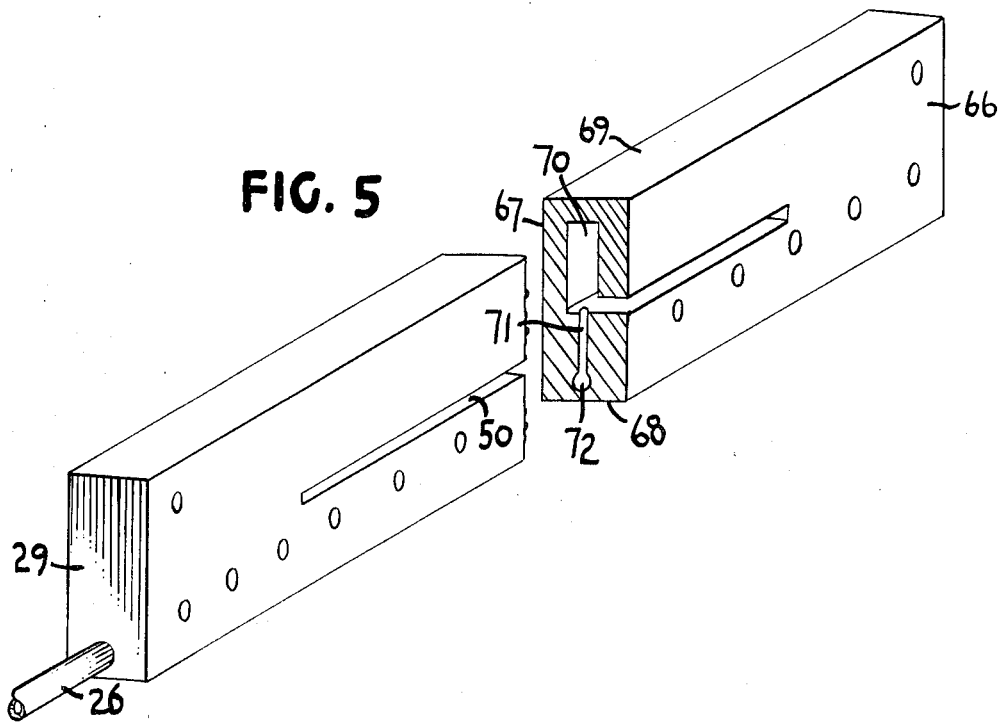
FIG. 5 is a perspective view partially in section of the mercury inlet 29 of the bottom half cell of the cell assembly shown in FIG. 2.

As shown in more detail of FIG. 5, which is an enlarged perspective view of the mercury feed distributor 29, this unit contains an elongated slot 50 on its side so that the mercury, when it reaches the level of the slot, flows out of the distributor and across the tray 11 associated with that distributor. An identical configuration of the mercury distributor is contained in the unit 27 of FIG. 2 so that the slotted device constantly provides a film of mercury across the tray 9 with which that distributor is associated. As will be understood by those skilled in the art, the trays themselves are titlted downwardly from the mercury feed point to the collection point or sumps 30 and 31 so that the mercury will flow by gravity from the feed point to the sumps or collection points 30 and 31.

Located on the longitudinal sides of the trays between each cell tray are adjustable supports which comprise plates or housings 51, 52, 53 and 54. Contained in each of these housings is an adjusting screw element 55 which rests on an insulated member 56 of the unit immediately below. Suitable electrical insulation, such as micarta, may be employed for this purpose so long as it provides adequate insulation to prevent shorting caused by the differences in potential between the various cell units associated with each of the housing members. Note that these screws rest upon or bear against the insulating member, but are not anchored or attached thereto. Consequently, the several adjusting screws are slidably or yieldably in contact with their respective insulating bases or bearing plates so that movement with respect thereto is possible.

This has several advantages. In a stack of several bipolar units, one of the units or the anode half cell or the cathode half cell may be repaired or replaced simply by lifting that portion of the stack which is above the unit to be repaired or replaced and thus gaining access to such unit without changing the screw adjustment of the lifted units in the stack. Further, in the operation of the cell or in the adjustment of units, stresses placed on the other units can be relieved because the contact of the screw and the support are simply surface contacts and the screw supports may move slightly to accommodate to the stress. This tends to reduce the hazard of leakage of cell gas from the units. Of course, the gasket 59, being flexible, deforms or expands to accommodate for the adjustments while maintaining the seal between the units. These adjustable screw elements are utilized to provide a proper slope for the flowing mercury between the various cell units employed and to provide a means for adjusting the level of the mercury across the width of the cell to thereby insure uniform distribution of mercury across the width of the cell.

It will also be apparent that as the screw elements are forced against the insulated support member 56, the space between the two opposed units is increased and the units to which the screw is attached as well as all upper units are raised. This not only changes the slope of the trays, but also the spacing between the anode of the upper unit and the mercury cathode of the lower unit. Thus, a convenient means is provided for adjusting anode spacing since the anodes of each cell unit may be raised or lowered to a proper spacing from the cathode by adjusting the screws to raise or lower the trays to which they are attached or which they engage.

Figure 3:
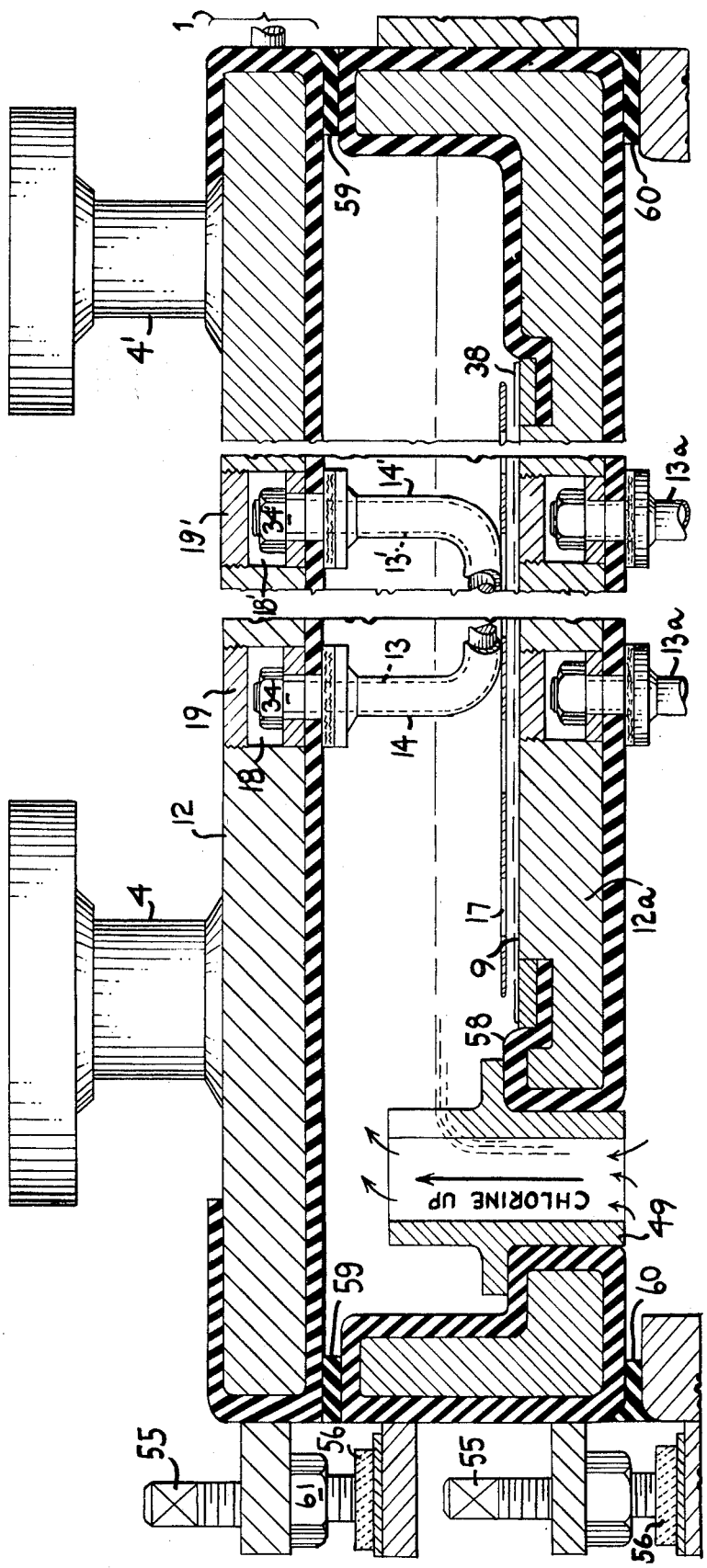
FIG. 3 is a cross-section of the cell of FIG. 2 taken along lines I—I of FIG. 2, the center section being partially omitted, showing the chlorine outlet and one modification of the anode attachment and electrical connection to the anode. This view shows a support means of the type herein contemplated.

Turning now to FIG. 3, the details of the construction and the electrical connection to the cell anodes can be readily seen. In FIG. 3 there is shown the cell cover member generally indicated as 1, which shows two drilled holes 18 and 18' in the back-up plate 12 suitably plugged with plug members 19 and 19'. Located immediately below the plug are bolt elements 34 and 34' which have affixed thereto rod members 13 and 13', preferably constructed of copper and sheathed in a titanium tube or sheath 14 and 14', respectively. The copper rods encased in titanium are sheaths' curved at the bottom into a flat member which is welded to a platinized titanium anode member 17. Thus, the titanium encased copper rods serve as support members for the anode 17 as well as means for distributing current thereto. The mercury contained within the cell, generally indicated by the numeral 38, flows beneath the anode member 17 on a steel tray 9 which, at its peripheral edges, is bonded to a rubber lining 58 of the cell unit 7. The base member 12a of the tray 9 serves as the back plate for the next anode and conducts the electrical current from the cathode of the first cell to the current distributor 13a of the next adjacent cell unit which is located immediately below it and like rod 13 is also encased in a titanium sheath. The insulation 58 and the presence of gasket 60 serves to protect the cell above from shorting out with the cell below. The chlorine from the bottom cell rises up through the brine down-comer 49 as brine from the upper tray falls downwardly through the down-comer 49 in countercurrent contact therewith. Gaseous chlorine ultimately escapes from the cell through outlet 4 located in the cover member 1 of the cell. While in the drawing of FIG. 3 only a single unit of attachment to the cell anode is shown, it is, of course, understood that a plurality of these units extend across the cell to provide adequate support for the flat platinized titanium anode and prevent it from warping during operation. A gasket 59 is placed between the cover member or upper anode containing member of the cell and the tray 9, and a similar gasket 60 is located between the cell unit 7 and the bottom 8 of the cell. These gaskets serve to insulate and seal one cell from the other during operation. To the side of the cell and underneath the adjusting screw member 55 is a nut 61 which is affixed in place when proper adjustment of the slope of the cell trays has been made.

Figure 4:
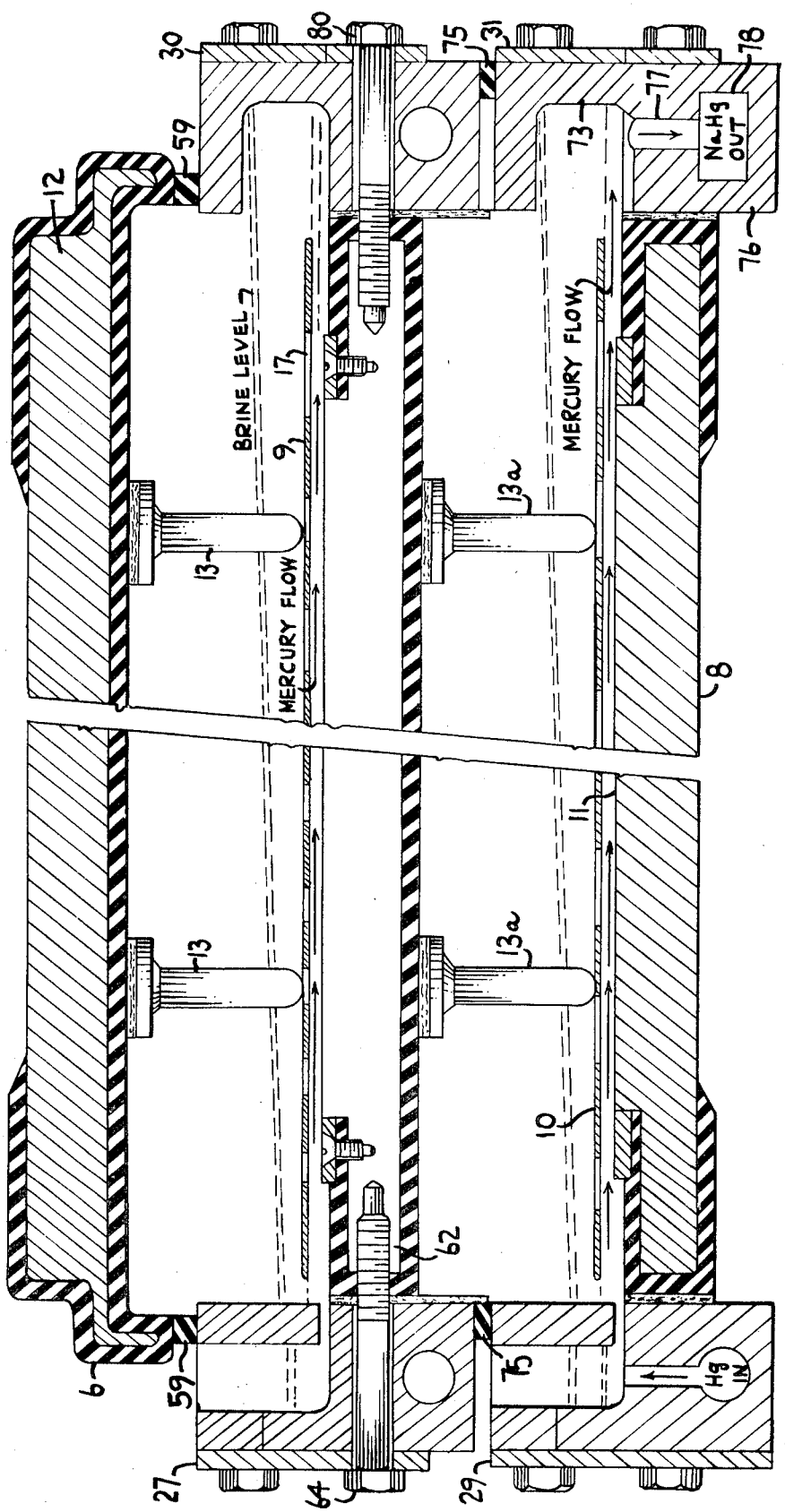
FIG. 4 is a cross-section of the cell taken along lines II—II of FIG. 2, the center section being partially omitted, showing the anode half cell of the cell assembly, the cathode half cell of the cell assembly, and the intermediate cell unit, and showing in detail the mercury inlet and outlet and the relationship of the brine and the mercury within the cell.

Turning to FIG. 4, there is shown the relationship of the electrical support members or rods 13 to the anodes 17, as well as the relationship of rods 13a to the cell unit anode 10. In addition, the positioning of the mercury feed reservoirs 27 and 29 and the mercury-amalgam sumps 30 and 31 of the cell are also depicted. The mercury cell distributors 27 and 29 are bolted to the ends of each tray by suitable tapped bore holes 62 in the cell trays 9 and 11, respectively. These tapped bore holes 62 are provided with bolt elements 64 and the entire units are thus bolted to the cell trays 9 and 11.

As shown in FIGS. 4 and 5, the mercury distributor 29 consists of two side members 66 and 67, a bottom member 68, and a top member 69 which define a hollow cavity 70. The side member 66 which abuts against the cell tray 11 is slotted at 50 on its long axis so as to be open to the tray 11 with which this distributor 29 is associated. The distributor 29 is also provided with a slotted channel 71 in the vertical direction which channel 71 communicates with the long axis slot 50, and a cavity 72 at the bottom end. Cavity 72 runs parallel to slot 50 along the long axis of the distributor 29. Thus, mercury introduced through line 26 into the cavity 72 traversing the long axis of the distributor 29 rises through the vertical slot or channel 71 to the chamber 70 and from there, by virtue of the slot 50 communicating with the tray 11, mercury is introduced into the cell tray 11 and flows across the tray and the face of the anode 10 placed above the tray. If desired, cavity or channel 72 may be provided with a plurality of drilled holes in lieu of the vertical channel 71 so that a plurality of spaced channels are provided instead of a unitary slot. Similarly, channel 72 may be a pipe having a plurality of openings on its upper surface at spaced intervals which communicate with a plurality of spaced vertical holes. Such spaced holes would, of course, terminate in the chamber 70 in this case, as does the vertical slot 71. The mercury, as mercury amalgam, as it reaches the opposite end of the cell, enters the sump 31 formed by the side 73, top member 74, and bottom member 76. The mercury, as it enters this chamber, settles through a vertical slot 77 into a small reservoir member 78 and is ultimately removed from the cell. This mercury collection or amalgam collection member or sump 31 is affixed to the side of the cell as sump 30 is attached. Sump 30 is provided with a tapped bore hole 79 located in the tray 9 and by utilizing suitable bolts 80 is affixed to tray 9. The mercury distributor 27 is of identical construction to the reservoir 29 hereinabove described but, as will be obvious, it is associated with tray 9. Similarly, the sump 30 is identical in construction to the sump 31 described above, but is associated with tray 9.

Turning now to FIGS. 10 and 11, there is shown another modification of the anode 17 of the cell cover and anode 10 of the cell unit in which the electrical connection and the supporting of the anode is accomplished by means of metal plates 81 in lieu of the titanium sheathed copper rods 13 of FIGS. 3 and 4. In this modification, titanium lugs 82 are affixed to the backing plates 12 and 12a of the anodes of the cell cover 1 and cell unit 7, respectively, and have attached to them through a suitable screw member 83, a plurality of metal plates 81 and 81' which are suitably welded to the upper portion of the anodes 17 and 10. A plurality of these metal plates 81 and 81' are placed across the back of the anodes 17 and 10 to provide suitable electrical distribution to the face of the anodes 17 and 10 to prevent these anodes from warping during cell operation. The relationship of the brine feed lines 5 and 5', chlorine outlets 4 and 4', and mercury feed lines 25 and 26 remain the same in this modification, the essential difference between this modification and those shown in FIGS. 3 and 4 being in the electrical connection to the anodes 17 and 10. The structure of the distributors 27 and 29, sumps 30 and 31, and the trays 9 and 11 and all other equipment is essentially the same as described with reference to the embodiment shown in FIGS. 3 and 4.

Figure 6:
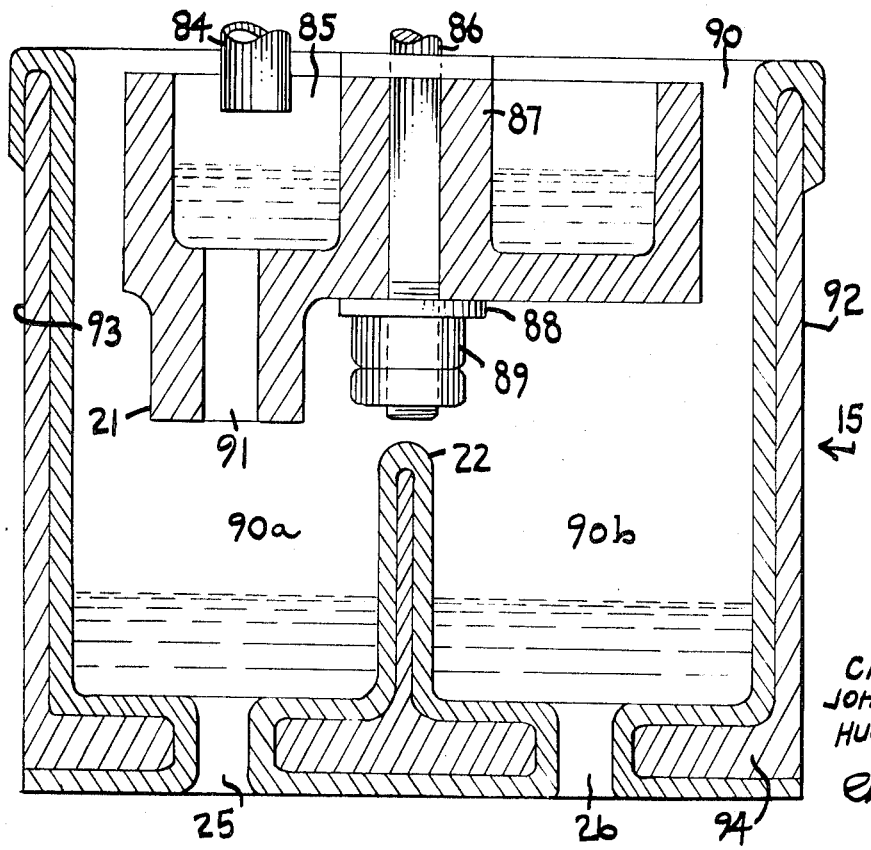
FIG. 6 is a cross-section of the mercury feed splitter 15 shown in FIG. 1.

Turning now to FIG. 6, the mercury splitter 15 of FIG. 1 is shown in cross-sectional detail. This splitting device 15 is comprised of a mercury inlet tube 84 which fills a cavity 85 formed in the center of the device and which rotates around shaft member 86. Shaft 86 is positioned in a suitable housing 87 and held firm by washer 88 and nut 89. A depending nozzle 21 communicates through a channel 91 with the cavity 85. The nozzle 21 rotates in a chamber 90 formed by the sides 92 and 93, and bottom 94 of the splitter 15. The bottom member 94 of the container is divided by a member 22 which rises vertically in the center of the splitter 15 and serves to equally divide mercury entering through the nozzle 21 between chambers 90a and 90b. All portions of the splitter 15 which are in contact with the mercury are rubber covered by rubber linings to provide adequate insulation and assist in breaking the electrical current between the mercury located in each of the individual sections of the splitter 15. The outlets 25 and 26 of the splitter 15 feed the two individual cells shown in FIG. 1 through the distributor members 27 and 29. While only two feed units are shown feeding two cells in this figure and in FIG. 1, it is, of course, to be understood that a multiplicity of these cells may be employed, in which case the splitter 15 would be divided into a sufficient number of individual feed units to provide an individual mercury cell feed for each individual mercury cell employed.

Turning to FIGS. 7 and 8, the sodium-mercury amalgam leaving the electrolytic cell is introduced into the splitting device 35 of FIG. 1. This device is shown in two sectional views in FIGS. 7 and 8. In FIG. 7, sodium-mercury amalgam leaving the cell through line 32 enters unit 35 and is dropped into one of the compartments 96 of the compartmented wheels 97 and 97'. As each compartment 96 becomes filled, on the principle of the water-wheel, the mercury amalgam pushes the water-wheels in a clock-wise direction, thus electrically splitting it and dropping it into the sump 98, from which it is removed via outlet 36 and introduced into the mercury amalgam denuder 37.

While the wheel 97 can operate on a water-wheel principle, provision may be made to drive it by coupling shaft member 105 to a suitable motor and belt arrangement. As with the mercury splitter 15, the number of compartmented wheels employed will depend on the number of complete cells employed in the completed cell.

The denuder 37 shown in FIG. 9 in cross-section is comprised of a steel shell 99 having a perforated baffle 100 located at the bottom thereof and a water inlet 38. The bottom member 101 of the denuder is provided with an outlet 41 for the removal of denuded mercury. In the upper portion of the denuder is located an outlet 39 for the removal of caustic soda. Sodium amalgam is introduced through pipe 36 to a baffle member 102 located in the upper portion of the denuder where it flows downwardly through a perforated plate member 103 and in contact with graphite particles 104 located between perforated baffle 100 and the baffle 102. Hydrogen escapes from the cell through a suitable outlet 40, not shown in FIG. 9.

Figure 12:
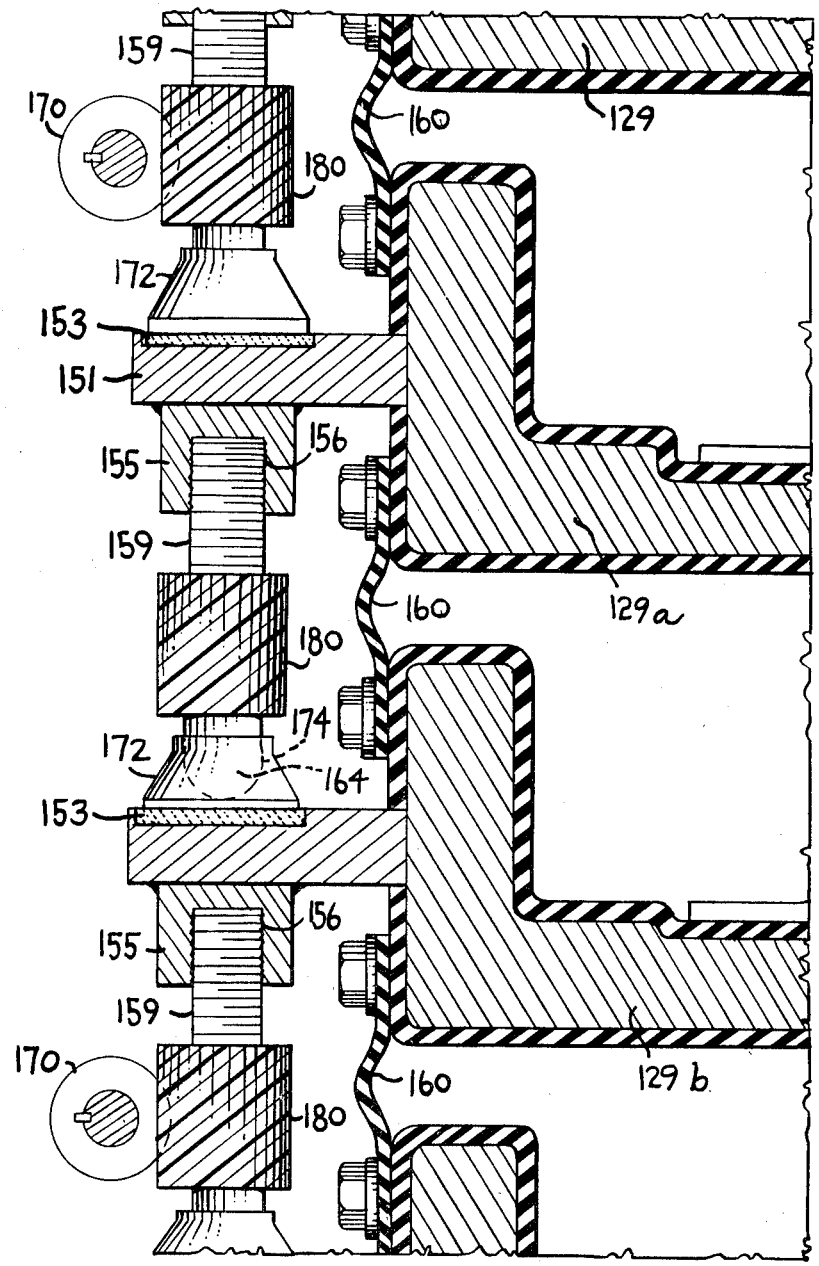
FIG. 12 is an enlarged fragmentary view of an alternate embodiment illustrating the member of establishing a flexible seal between cell units.

FIG. 12 shows a further embodiment adapted to provide wider relative movement between the respective units or trays without breaking the seal in the cell units. As shown thereon, the various trays 129 and 129a are supported by means of metal support bases or plates 151 projecting from the sides of each tray 129 or 129a. A ceramic or other electrically insulating disc 153 is seated in the top surface in each of these trays to effectively insulate one tray from the other. Each support plate 151 has welded to the bottom face thereof a metal member 155 having a screw threaded socket 156. Metal screw 159 is threaded into the hole 156 and projects downwardly, terminating in a ball joint 164 which is seated in its socket 174 disposed in a base member 172. This base member rests upon the ceramic disc 153 of the base plate 151 rigidly attached to the next lower tray or cell unit back plate 129a.

The screw is provided with a boss 180 which may be engaged to rotate the screw in its socket and by virtue of the threads in socket 156 to raise or lower the upper tray and thereby change the slope thereof or the gap between the opposed anode and cathode of the respective adjacent trays. Of course, raising a lower tray in this manner raises the level of all upper units, but without disturbing the relative positions thereof.

To provide a flexible seal between trays and thereby facilitate relative movement thereof, a rubber or other chlorine resistant and impermeable nonelectroconductive or electrically insulating strip 160 is mounted on opposed edges of adjacent units and extends around the cell trays and anchored tightly thereto to enclose the space between the trays and to provide a flexible seal between the trays. This strip flexes as shown in FIG. 12 to accommodate for the desired spacing between the trays while yet preventing escape of chlorine from the cell into the surrounding atmosphere.

The boss 180 may be provided externally with a helical gear which engages a mating drive gear 170 to rotate the screw.

While the invention has been described with reference to the formation of chlorine and sodium-mercury amalgam from brine, it is, of course, possible to utilize the instant cell to manufacture other alkali metal hydroxides from the corresponding alkali metal chloride solution. Thus, KCl can be readily electrolyzed to produce chlorine and potassium-mercury amalgam and ultimately potassium hydroxide.

Further anodes coated with electroconductive metal oxides may be used. Thus, the anode may comprise a titanium, tantalum, carbon, or lead dioxide impregnated carbon (graphite) base having an electroconductive coating of ruthenium oxide or oxide of another platinum group metal, or mixture of such oxides.

While the invention has been described with reference to certain specific details and embodiments thereof, it is not intended that such details or embodiments shall limit the scope of the invention except insofar as and to the extent imposed by the claims hereof.

What is claimed is:

1. In an alkali chlorine bipolar cell having a plurality of stacked units with an anode unit on the top, a mercury cathode unit on the bottom, and at least one bipolar unit between the anode unit and the cathode unit and providing an anode opposite a mercury cathode of a lower unit and a mercury cathode opposing an anode of an upper unit; and individual adjustable support means between a pair of said units, the improvement wherein said individual vertical adjustable support means comprise:

a first support base outwardly projecting from the upper member of said pair of units and having a threaded aperture open at the bottom thereof;

a second support base outwardly projecting from the lower member of said pair of units; and a support member, an upper portion thereof vertically and screw adjustably mounted in said threaded aperture, and the lower portion thereof terminating and removably bearing on said second support base.

2. The cell of claim 1 wherein the support member horizontally slideably bears against said support base of the lower unit.

3. The cell of claim 1 wherein means are provided to electrically insulate the support bases of adjacent units from each other.

4. The cell of claim 3 wherein said electrically insulating means comprises an insulating surface on the top surface of the second support base.

References Cited

UNITED STATES PATENTS

| 2,154,830 | 4/1939 | Bencker | 204—219 X |
| 2,576,553 | 12/1951 | Andreasen | 204—219 |
| 2,719,117 | 9/1955 | Blue et al. | 204—220 |
| 2,848,406 | 8/1958 | Szechtman | 204—219 |
| 2,872,403 | 2/1959 | Honsberg | 204—220 |

JOHN H. MACK, Primary Examiner

D. R. VALENTINE, Assistant Examiner

U.S. Cl. X.R.

204—250, 279